United States Patent [19]

Fanning

[11] 4,162,476

[45] Jul. 24, 1979

[54] ACCELERATION BALANCED HYDROPHONE II

[75] Inventor: Bryce L. Fanning, Dartmouth, Canada

[73] Assignee: Her Majesty the Queen in right of Canada, as represented by the Minister of National Defence, Ottawa, Canada

[21] Appl. No.: 734,407

[22] Filed: Oct. 21, 1976

[30] Foreign Application Priority Data

Feb. 18, 1976 [CA] Canada .................................. 245994

[51] Int. Cl.$^2$ .............................................. H04B 13/00

[52] U.S. Cl. ............................................ 340/10; 340/9

[58] Field of Search ...................... 340/3 PS, 3 T, 8 R, 340/9, 10, 12, 13; 310/319, 337

[56] References Cited

U.S. PATENT DOCUMENTS

| | | | |
|---|---|---|---|
| 2,762,032 | 9/1956 | Vogel | 340/8 R |
| 2,945,208 | 7/1960 | Samsel | 340/10 |
| 3,025,359 | 3/1962 | Schilling et al. | 340/10 |
| 3,187,300 | 6/1965 | Brate | 340/10 |
| 3,311,873 | 3/1967 | Schloss | 340/10 |
| 3,333,236 | 7/1967 | Schloss | 340/8 R |
| 3,561,832 | 2/1971 | Karrer et al. | 310/338 |
| 3,593,048 | 7/1971 | Dunegan | 310/319 |
| 3,713,086 | 1/1973 | Trott | 340/10 |
| 3,731,264 | 5/1973 | Campbell | 340/3 PS |
| 3,781,781 | 12/1973 | Groves, Jr. | 340/10 |
| 3,832,762 | 9/1974 | Johnston et al. | 340/8 R |
| 3,988,620 | 10/1976 | McDavid | 340/10 |
| 4,017,824 | 4/1977 | Fife | 340/10 |

*Primary Examiner*—Harold J. Tudor
*Attorney, Agent, or Firm*—Laff, Whitesel & Rockman

[57] ABSTRACT

A hydrophone which provides for cancellation of signals caused by acceleration forces and variations in water pressure head. The structure is comprised of a transducer for sensing an acoustic pressure wave as well as an acceleration force, and an accelerometer, which is isolated from the acoustic pressure wave, for sensing only the acceleration force. The transducer and the accelerometer are connected so as to subtract the acceleration output. Only the acoustic pressure wave output signal remains. Circuitry is also provided for cancelling the pressure head signal.

10 Claims, 4 Drawing Figures

ACCELERATION BALANCED HYDROPHONE II

This invention relates to a hydrophone which compensates for signals produced by acceleration of the hydrophone in water, and can also compensate for signals caused by a varying head of water.

A hydrophone is responsive to acoustic pressure signals in water, and thus may be utilized for submarine detection, or the like. When lowered by a tether or cable from a ship or buoy, the hydrophone is however often subjected to acceleration forces caused by waves, strumming of the cable, etc. The resulting acceleration of the hydrophone in the water causes the equivalent of pressure waves to generate output signal voltages to the cable, which can be interpreted falsely and/or swamp the signal to be detected.

If the motion of the hydrophone is along the vertical, there will be a further extraneous voltage generated as a result of alternating change in head of water, causing a signal response to be produced.

Clearly, it is desirable to have a hydrophone which has a low acceleration-to-acoustic response ratio and also is not, or is poorly responsive to the change in head of water.

One design for reducing the acceleration output of a hydrophone is to mechanically isolate the hydrophone from the source of motion by means of a system of compliant members, weights and damper plates. However, this structure is complex and needlessly expensive. Such a system is difficult to launch and recover in high sea states. In addition, the mechanical linkages are a source of possible noise.

Another design for reducing the acceleration output of a hydrophone is to provide two acoustic sensors mounted such that the acceleration output of one is equal in magnitude and opposite in polarity from the other. The two acoustic sensors are connected so as to cancel the acceleration output signal. However, it is clear that a hydrophone designed with two acoustic sensors is larger than an unbalanced hydrophone of the same acoustic sensitivity. In addition, the larger size of this structure could result in a reduction of useful bandwidth.

A third design for reducing the acceleration output of a hydrophone is to provide a cylindrical hydrophone in which metal end caps are connected together with a rigid metal rod running coaxially through the cylinder. The rod is fabricated of piezoelectric ceramic and is isolated from the end caps by means of compliant members of rubber or plastic. However, it is likely that with time, the mechanical properties of the rubber or plastic compliant members will change, resulting in an increased acceleration output signal. In addition, precision parts are required, which must be carefully assembled to ensure symmetry of mass and compliance.

In addition, none of the prior art systems provide compensation for head of water variations (to be referred to below by the general term "pressure head").

The present invention provides, in a single hydrophone, an improved, low cost structure, by which the acceleration signal component is cancelled. In addition, it allows compensation for response due to pressure head variations.

In general, the hydrophone is comprised of a transducer for sensing an acoustic pressure wave as well as an acceleration force, and an accelerometer, which is isolated from the acoustic pressure wave, for sensing only the acceleration force. The transducer and the accelerometer are connected so as to subtract the acceleration output. Only the acoustic pressure wave output signal remains.

A more detailed description of the invention is given below, with reference to the following drawings, in which.

Figure 1:
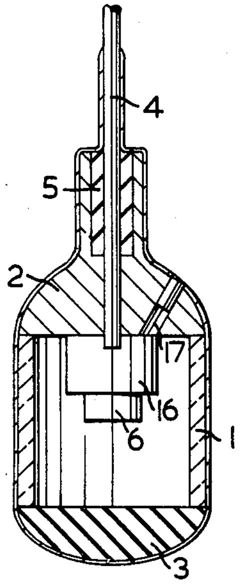
FIG. 1 is a front sectional view of one embodiment of the invention.

Turning first to FIG. 1, a hydrophone is shown in front section through its vertical axis. In this embodiment, an acoustic transducer is provided in the shape of a radially poled piezoelectric cylinder 1. A pair of end caps 2 and 3 enclose the opposite ends of the cylinder 1. Preferably end cap 3 is made of epoxy resin, and end cap 2 is made of aluminum. A cable 4 enters end cap 2 through a central bore. The end cap can be extended cylindrically surrounding the cable for a desired distance. Preferably the bore is sealed with an epoxy resin compound 5.

Within the cylinder an accelerometer 6 is rigidly fixed to end cap 2.

In operation, acoustic pressure waves cause the piezoelectric cylinder 1 to provide a signal in a well known manner. Since the accelerometer is fixed and shielded within the piezoelectric cylinder, it does not respond to the acoustic pressure waves.

However, acceleration forces exerted via cable 4 are felt by both the piezoelectric cylinder transducer and the accelerometer. Consequently the output signal from the accelerometer can be processed and thus cancel the transducer output signal. Since there will be no acoustic pressure wave component in the accelerometer, the subtraction will not affect the resulting acoustic output signal.

Figure 2:
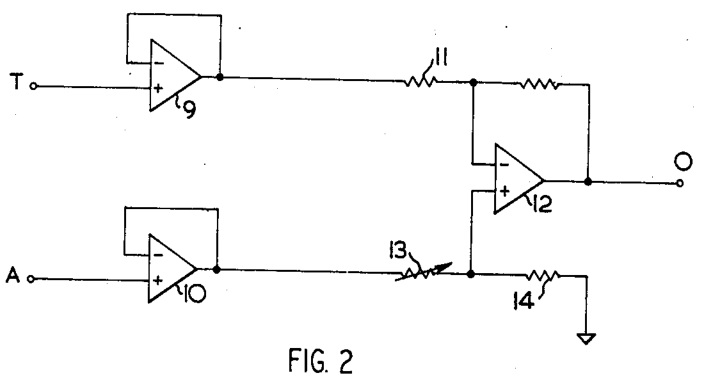
FIG. 2 is a schematic diagram of circuitry utilized in cancellation of the acceleration component.

FIG. 2 shows a schematic diagram of a circuit which can be used with the hydrophone embodiment of FIG. 1. The output of the acoustic transducer, piezoelectric cylinder 1, is applied at terminal T, which is connected to the + input of operational amplifier 9. Similarly, the output of the accelerometer 6 of FIG. 1 is applied to terminal A, which is connected to the + input of operational amplifier 10.

The output of operational amplifier 9 is connected through a resistor 11 to one of the inputs of differential amplifier 12, and the output of operational amplifier 10 is connected to the other input of differential amplifier 12 through a resistor 13, which is also connected through a resistor 14 to ground. Resistors 13 and 14 thus form a voltage divider. Preferably, resistor 13 is variable. An output signal from differential amplifier 12 is obtained at terminal O.

The output signals are applied through amplifiers 9 and 10 and through weighting resistors 11 and 13 to differential amplifier 12. Resistor 13 can be adjusted to provide a balanced signal into differential amplifier 12. The two acceleration signals will thus be cancelled, and the output signal at terminal O from differential amplifier 12 will be the acoustic signal detected by piezoelectric cylinder 1, the acoustic transducer.

Of course in the event the signals or the nature of the accelerometer and the transducer used are such that the signals can be applied directly to differential amplifier 12, operational amplifiers 9 and 10 can be deleted. In addition, the weighting resistors 11 and 13, etc., can be deleted provided the acceleration signals are identical, and that other well known coupling requirements are satisfied, for instance, matching impedance, signal amplitude, etc.

The differential amplifier may be located within the hydrophone, for instance centrally as shown by circuitry module 16 in FIG. 1. Access to variable resistor 13 after assembly can be obtained through a hole 17 which passes through end cap 2. The entire hydrophone is assembled and tested, and resistor 13 is adjusted through hole 17 to provide a zero acceleration component output from amplifier 12. Hole 17 is then sealed to prevent water from entering.

Where the output signals of both the hydrophone and the accelerometer are available, and for the situation in which the hydrophone is mounted with its axis along the vertical, the output can be processed to remove or reduce the pressure head signal as well as the acceleration output. The hydrophone response to changes in pressure or hydrostatic head, for a given acceleration, has been determined to be a function of hydrophone sensitivity and frequency. The output signal due to pressure head for a given acceleration has been found to fall off by 12 dB/octave. In contrast acceleration response component has been found to be constant with frequency for a given acceleration.

Figure 3:
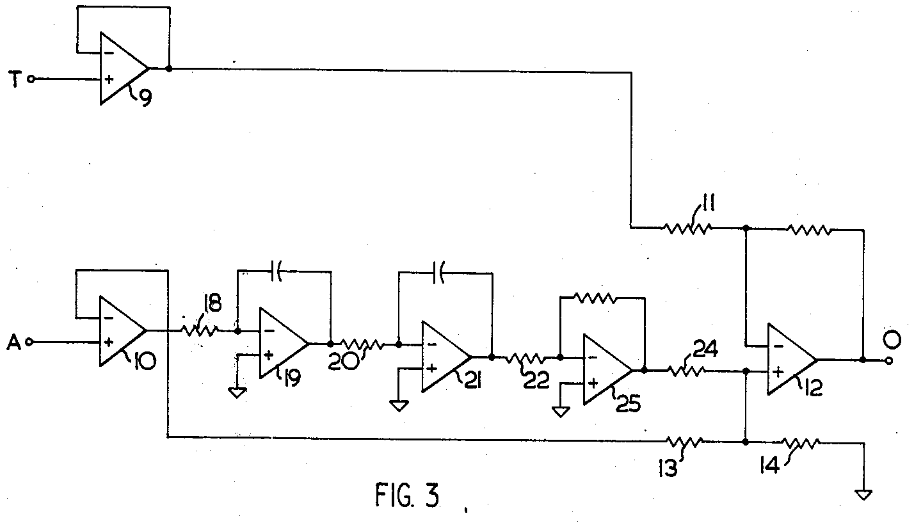
FIG. 3 is a schematic diagram of circuitry utilized both for acceleration and pressure wave cancellation.

Turning to FIG. 3, a circuit is shown for processing of both signals. The acoustic transducer output provided by piezoelectric cylinder 1 is applied at input T which is connected to the input of unity gain amplifier 9. The output of amplifier 9 is connected through weighting resistor 11 to a first input of differential amplifier 12 in a similar manner as in the circuit of FIG. 2.

The output of the accelerometer is applied to terminal A, which is connected to the input of unity gain amplifier 10. The output of amplifier 10 is connected through weighting resistor 13 to the other input of differential amplifier 12. Resistor 13 is also connected through resistor 14 to ground. Resistor 14 completes a voltage divider with resistor 13, which divider has its tap connected to the second input to differential amplifier 12.

The circuit described so far provides processing an cancellation of the acceleration output components from both the acoustic transducer and the accelerometer, as in the circuit of FIG. 2.

In parallel with resistor 13, however, is a series of two −6 dB/octave amplifiers which operate to compensate for the aforenoted −12 dB per octave pressure head signal. These amplifiers are comprised of the series connection of resistor 18, operational amplifier 19, resistor 20, and operational amplifier 21. Since each of the amplifiers introduces a 90° phase shift to the signal passing therethrough the output of the last amplifier 21 is applied to a 180° phase inverting amplifier comprising resistor 22 and operational amplifier 23 in order to reestablish the original phase. The output of operational amplifier 23 is passed through weighting resistor 24 to the second input of differential amplifier 12.

In operation, a compensating signal to the pressure head component is obtained from the accelerometer by passing the signal from the accelerometer through unity gain buffer amplifier 10, and through amplifiers 19 and

21 in which the signal is frequency corrected. The signal is then passed through amplifier 23 where it is phase corrected to come into phase with the pressure head signal from the acoustic transducer. Weighting resistor 24 corrects the signal amplitude to equalize with the pressure head signal from resistor 11, resulting in the pressure head signal being cancelled in differential amplifier 12. Resistors such as 24 and 13 can of course be made variable, and adjustable after assembly of the hydrophone.

It may thus be seen that the acceleration and pressure head signals provided by the acoustic transducer and the accelerometer are adjusted for equality and cancelled by differential amplifier 12. The values of resistors 24, 13, and 14 should be calculated in well known manner to make the voltages at the second input terminal to differential amplifier 12 equal in magnitude to the respective acceleration and pressure head signals of the acoustic transducer. Their values will of course be dependent on the accelerometer sensitivity as well as the pressure sensitivity and acceleration response to the acoustic transducer, and minor mechanical variations.

Figure 4:
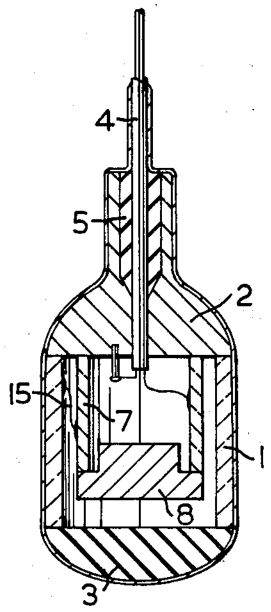
FIG. 4 is a front sectional view of a second embodiment of the invention.

Turning now to FIG. 4, the mechanical portion of another embodiment of the hydrophone invention is shown. In this embodiment, acceleration response reduction is accomplished without the use of electronics. Portions of the structure are similar to the structure of FIG. 1 as follows. A piezoelectric cylinder 1 is provided with end caps 2 and 3 as well as cable 4 passing centrally through end cap 2. End cap 2 can have a cylindrical extension surrounding the cable for a desired distance, and preferably is filled with an epoxy resin seal 5 as described earlier.

However, interior of the piezoelectric cylinder 1 is a second piezoelectric cylinder 7 which is of smaller diameter and length than piezoelectric cylinder 1.

One end of piezoelectric cylinder 7 is bonded coaxially with cylinder 1 to end cap 2. The other end of cylinder 7 is capped by a weight 8, which is preferably bonded around the edge of the cylinder.

In operation, the second cylinder 7 with weight 8 attached thereto operates as an accelerometer similar to the accelerometer of FIG. 1. An acceleration output signal is now produced by both of cylinders 1 and 7, and an acoustic output signal is produced only by cylinder 1. The acceleration components can be subtracted, resulting in a remaining acoustic output.

The accelerometers is designed, to provide an acceleration change response equal to that of piezoelectric cylinder 1, in order to have an output signal which fully cancels. While the specific design of the accelerometer is not the subject of this invention, the mass of the accelerometer can be calculated from the following expression:

$$M_1 = \frac{(M_C)_2}{2} + M_2 \cdot \frac{(g_{31})_2}{(g_{31})_1} \cdot \frac{C_2}{C_1} \cdot \frac{d_1}{d_2} - \frac{(M_c)_1}{2}$$

where $M_1$ = accelerometer mass $M_2$ = mass of hydrophone endcap $(M_C)_1$ = mass of accelerometer cylinder $(M_C)_2$ = mass of hydrophone cylinder $(g_{31})_1$ = piezoelectric constant of accelerometer cylinder $(g_{31})_2$ = piezoelectric constant of hydrophone cylinder $d_1$ = mean diameter of accelerometer cylinder
$d_2$ = mean diameter of hydrophone cylinder
$C_1$ = capacitance of accelerometer cylinder
$C_2$ = capacitance of hydrophone cylinder The two wires of cable 4 are respectively connected to the inside of cylinder 7 and the outside of cylinder 1 (the latter through aluminum end cap 2), placing the two piezoelectric cylinders in series across the two wires of cable 4.

With this construction, there is no need to apply the individual acceleration signals to a differential amplifier, the differential subtraction and thus the acceleration component cancellation being done automatically. The output signal from cable 4 will be simply the acoustic pressure wave signal corresponding to that received by piezoelectric cylinder 1, which may be further processed as by amplifying, etc.

While this embodiment is primarily aimed at cancelling acceleration output without the need to use differential amplifiers, it is clear that the circuitry described in conjunction with the embodiment of FIG. 1 will work in the same manner with the present embodiment.

The device of FIG. 4, may, of course, be manufactured according to the teachings of FIG. 1. In greater detail, FIG. 1 discloses a hole 17 in the end cap 2, for enabling an adjustment of a potentiometer or a variable resistor after the assembly has been manufactured. For example, a screw driver may be inserted through the hole 17 in order to adjust a potentiometer, which is the variable resistor 13, and is located within the housing. Then, the hole 17 is sealed to make the entire unit waterproof. This same hole 17 may also be provided in the same end cap 2 of FIG. 4.

It should also be noted that the adjustment screw driver could control a capacitance just as well a resistance. If such a variable capacitance is used, it is preferably connected in parallel with a piezoelectric element, much as capacitors are shown as being connected in parallel with the operational amplifiers 19, 21, 25. Of course, it is to be expected that a hydrophone having such a capacitive feed back would have a slightly greater sentitivity so that it may be trimmed down to match the other hydrophone.

The point is that, regardless of how it is done, an adjustment is made through the hole 17 in order to exactly balance the outputs of a pair of hydrophones, so that each will have the same relative responsive to the same signal.

It should be understood that the entire hydrophone should be made water impermeable, such as by coating it with a neoprene covering.

With an understanding of the above-described invention it may become clear to a person skilled in the art that other structures can be provided which utilize similar principles. All such alternative designs are considered to be within the scope of this invention, as defined in the appended claims.

The embodiments of the invention in which an exclusive property or privilege is claimed are defined as follows:

1. A hydrophone comprising:

(a) a concentric pair of cylindrical transducers nestingly mounted to form a common chamber with the axes of said cylinders positioned parallel to a vertical axis of said chamber;

(b) a first of said transducers comprising a radially poled pressure sensitive cylindrical piezoelectric acoustic transducer mounted parallel to the hydrophone axis;

(c) a second of said transducers comprising a cylindrical accelerometer mounted within the isolation-formed interior of the cylinder of the first transducer;

(d) the cylinder of said accelerometer transducer having a diameter and length which are smaller than the diameter and length of said cylindrical piezoelectric transducer for isolating therein the accelerometer from acoustic pressure; and (e) means for connecting the electrical outputs of the transducer and the accelerometer in a subtracting configuration.

2. A hydrophone as defined in claim 1, in which the outer piezoelectric cylinder further includes end caps for closing the individual ends of the cylinder forming the first transducer to complete said isolation within said interior, and a cable entering the hydrophone through one of the end caps.

3. A hydrophone as defined in claim 2, in which the subtracting means includes means for connecting the outer transducer cylinder and the accelerometer respectively to individual inputs of a differential amplifier, the cable having wires connected to the output of the differential amplifier, the differential amplifier being located within the outer cylinder.

4. A hydrophone as defined in claim 3, further including a pair of transmission paths each including a linear amplifier, one path being between the output of the accelerometer and one input of the differential amplifier and the other between the output of the hydrophone and the other input of the differential amplifier; means for adjusting the amplitude of a signal passing via one of the transmission paths, and an access hole in one of the end caps of the hydrophone for allowing adjustment of the adjusting means after assembly of the hydrophone.

5. A hydrophone as defined in claim 4, in which the adjusting means is comprised of a fixed and a variable resistor respectively in series with the individual inputs to the differential amplifier.

6. A hydrophone as defined in claim 3, further including first and second transmission paths respectively between the outer transducer cylinder and the first input of the differential amplifier, and between the accelerometer and the second input of the differential amplifier, the second transmission path being comprised of means for equalizing the magnitude and phase of the output voltage of the accelerometer to the output voltage of the transducer resulting from variations in the head of a water medium and to axial acceleration.

7. A hydrophone as defined in claim 3, further including similar operational amplifiers having their inputs connected to each of the outer transducer cylinder and the accelerometer, the output of the operational amplifier which is connected to the outer transducer cylinder being connected through a first weighting resistor to one input of a differential amplifier; the output of the operational amplifier which is connected to the accelerometer being connected through a second weighting resistor to the second input of the differential amplifier; the second weighting resistor being connected in parallel with a pair of operational amplifiers each having individual transfer functions of −6 dB per octave, a phase inverter, and a third weighting resistor, all connected in series; a fourth resistor being connected between the second input of the differential amplifier and ground; the resistance values of the second, third and fourth resistors being such as to set the voltage at said second input from the accelerometer equal to the voltage at the first input to the differential amplifier from the outer transducer cylinder resulting from variations of the water head and acceleration of the hydrophone.

8. A hydrophone comprising:

(a) a pair of radially poled, pressure-sensitive, cylindrical, piezoelectric transducers nestingly mounted coaxially with their common axes parallel to a vertical axis of the hydrophone;

(b) the inner one of said cylindrical transducers comprising an accelerometer mounted within the outer cylindrical transducers;

(c) means for sealing the interior space of the outer cylinder for isolating the accelerometer from acoustic pressure experienced by the outer cylinder; and (d) means for connecting the electrical outputs of the outer cylindrical transducer and the inner accelerometer cylindrical transducer in a subtracting configuration.

9. A hydrophone as defined in claim 8, in which the outer cylinder has end caps for completing the sealing of said interior space, in which the accelerometer comprising the inner radially poled piezoelectric cylinder which has a diameter and length which are shorter than said outer transducer cylinder and said inner cylinder is mounted with one edge connected to the inside of one of said end caps, and a weight fixed to the other edge of said inner cylinder, the accelerometer being adapted to have an acceleration change response equal to that of the transducer.

10. A hydrophone as defined in claim 9, in which the two piezoelectric cylinders are connected in electrical series opposing direction across a pair of wires in the cable.

* * * * *